United States Patent [19]
Conrad

[11] 3,905,209
[45] Sept. 16, 1975

[54] COMPRESSION HUB APPARATUS FOR MOUNTING A CYLINDRICAL BODY TO A ROTATABLE SHAFT

[75] Inventor: Rene A. Conrad, San Mateo, Calif.

[73] Assignee: Dynaloc Corporation, San Mateo, Calif.

[22] Filed: Mar. 14, 1974

[21] Appl. No.: 451,021

[52] U.S. Cl. .................. 64/15 R; 64/30 R; 64/30 E
[51] Int. Cl.² ............................................ F16D 3/52
[58] Field of Search ............. 74/230.01, 230.3, 240, 74/241; 403/368, 369, 371, 374; 64/15 R, 6, 15 C, 27 R, 30 R, 30 E; 192/65

[56] References Cited
UNITED STATES PATENTS

| 631,957 | 8/1899 | Diescher | 403/367 |
|---|---|---|---|
| 1,550,817 | 8/1925 | Karge | 64/30 E |
| 2,533,973 | 12/1950 | Starkey | 64/30 C |
| 2,707,108 | 4/1955 | Schottler | 192/65 |
| 2,763,141 | 9/1956 | Dodge | 64/30 R |
| 2,901,899 | 9/1952 | Berky | 64/30 D |
| 3,646,777 | 3/1972 | Anderson et al. | 64/30 R |

FOREIGN PATENTS OR APPLICATIONS

| 2,782 | 10/1890 | Germany | 403/368 |
|---|---|---|---|
| 834,075 | 4/1960 | United Kingdom | 192/65 |

Primary Examiner—Samuel Scott
Assistant Examiner—Allan R. Burke
Attorney, Agent, or Firm—Schatzel & Hamrick

[57] ABSTRACT

Compression hub apparatus for coaxially mounting a cylindrical body to a rotatable shaft and comprising a hub structure having an end wall with a central aperture for receiving the shaft and a cylindrical side wall defining a cylindrical recess therewithin, fasteners for securing the hub to the body, a deformable locking assembly including a plurality of deformable annular dish-shaped disks disposed within the recess and about the shaft, and a cover plate for mating with the hub. As the cover plate is drawn into mating engagement with the hub it applies an axially directed force upon the disks causing them to deform in such a manner that their inner periphery lockingly engages the shaft and their outer periphery lockingly engages the side wall thereby locking the body to the shaft. In an alternative embodiment, the locking assembly comprises a coiled continuous length of material having a transverse cross section resembling a skewed parallelogram, the length of material being helically wound such that the surface corresponding to one short side of the parallelogram forms the shaft engaging inner periphery and the surface corresponding to the opposite short side of the parallelogram forms the hub side wall engaging outer periphery.

3 Claims, 8 Drawing Figures

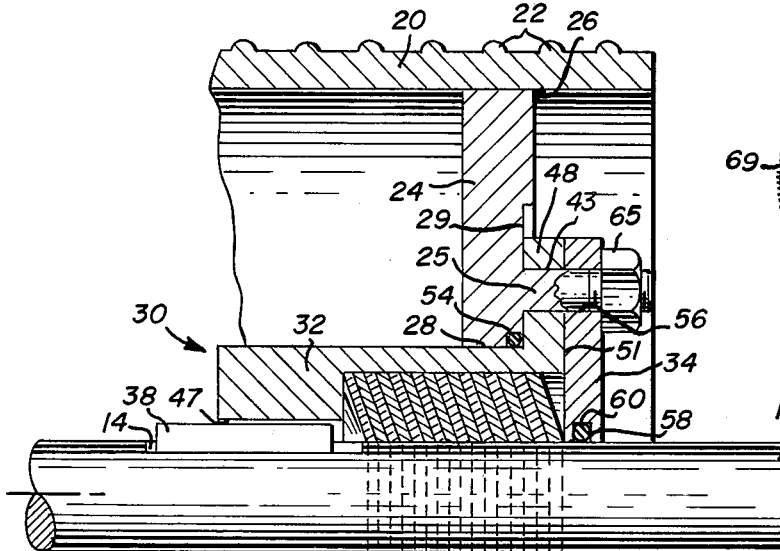
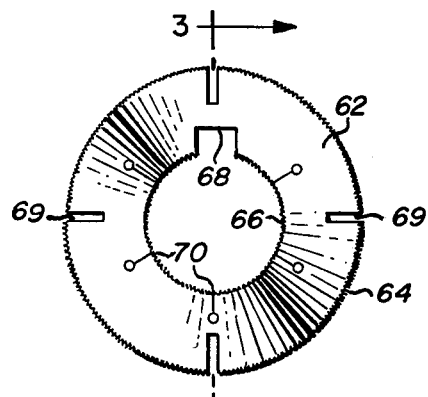
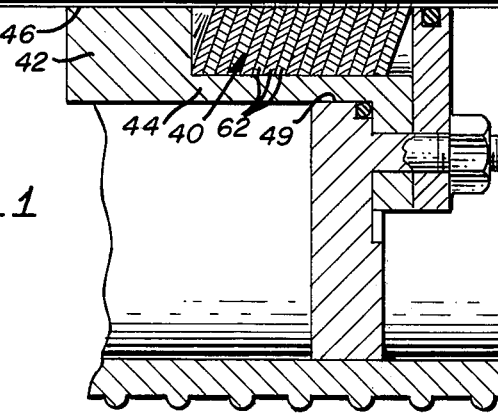
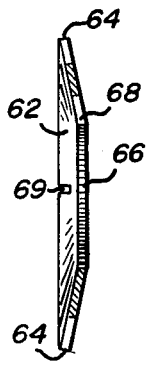
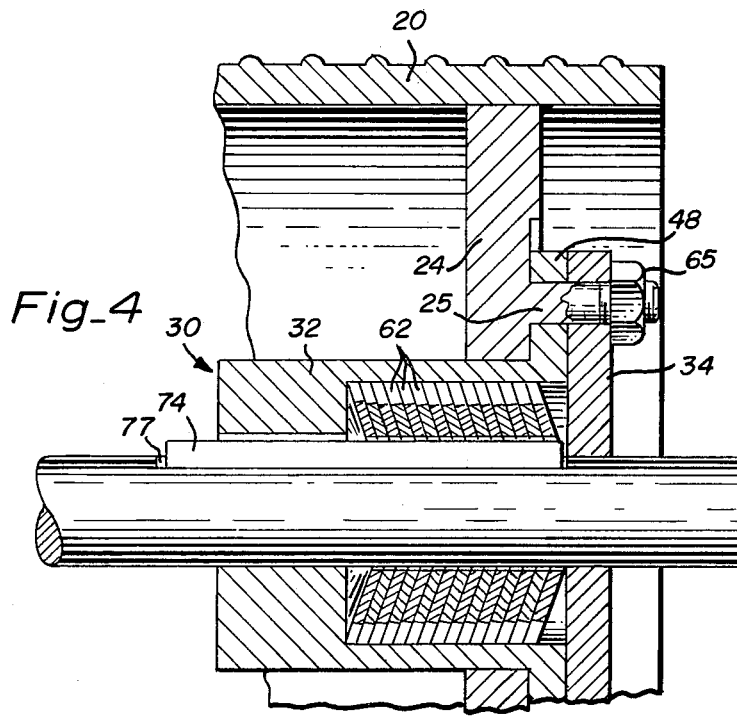

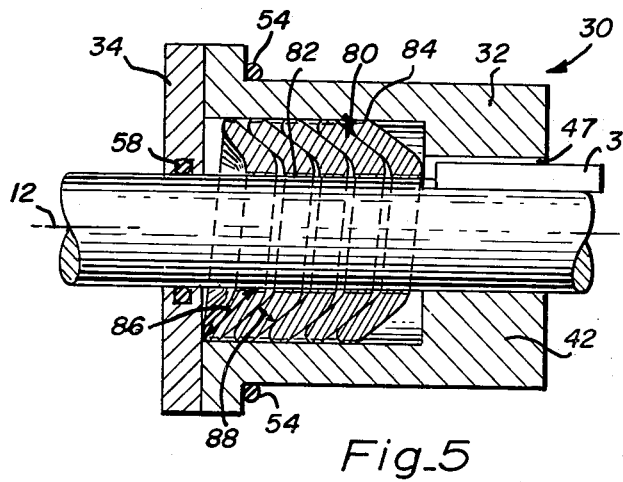
Fig_5
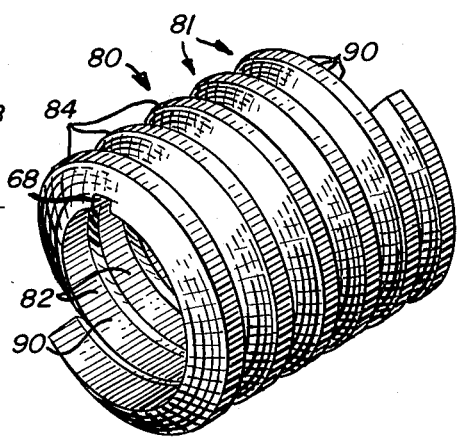
Fig_6
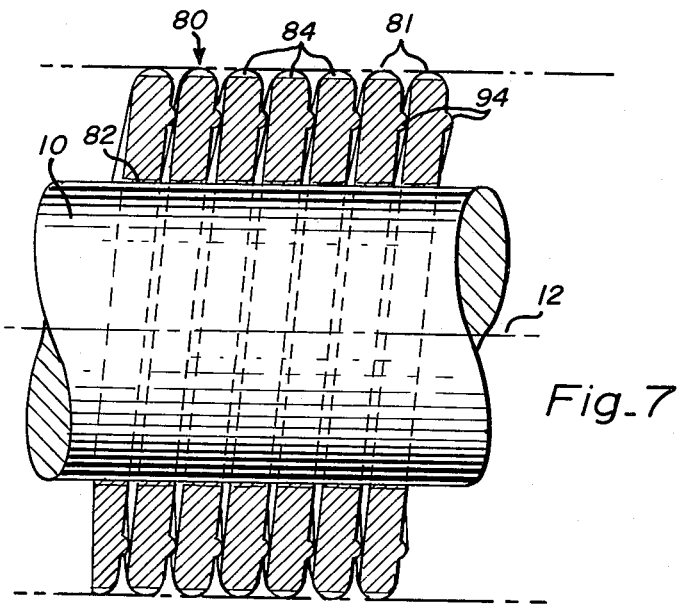
Fig_7
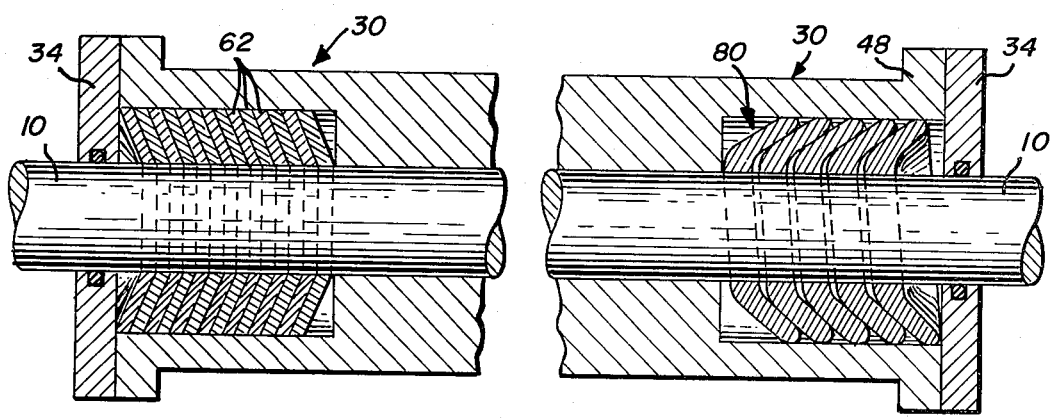
Fig_8

3,905,209

COMPRESSION HUB APPARATUS FOR MOUNTING A CYLINDRICAL BODY TO A ROTATABLE SHAFT

BACKGROUND OF THE INVENTION

1. Field of the Invention

The present invention relates generally to apparatus for coaxially mounting a cylindrical body to a rotatable shaft and, more particularly, to compression hub apparatus for accurately centering and securely affixing a cylindrical body such as a conveyor pulley to a rotatable shaft.

2. Description of the Prior Art

In the past, numerous techniques have been used to mount pulleys and other roller-like bodies to a shaft such that the body rotates with the shaft. For example, in one instance a central opening of the body is machined to a diameter that is slightly greater than that of a threaded shaft, and the shaft is inserted through the central opening. Thereafter, nuts are threaded over each end of the shaft and torqued against the body to securely couple the body to the shaft. However, the torque applied to the nuts tends to cause undesirable stresses to be set up in the shaft. The use of this technique is thus undesirable in applications where alignment precision and shaft strength are required.

Another mounting technique is to weld the body to the shaft. Although easily accomplished, this solution often times results in an eccentrically mounted body.

A third technique is illustrated in U.S. Pat. No. 3,772,931 entitled "Self-Centering Pulley System for Thin Film Material" by Rene Conrad and John Hohmann. This method merely locks the body to the shaft and does not provide self-centering of the body relative to the shaft.

OBJECT OF THE INVENTION

It is therefore an object of the present invention to provide a compression hub apparatus for mounting a cylindrical body to a shaft which is both simple in structure and reliable in operation.

Another object of the present invention is to provide a compression hub apparatus which self-centers the body to the shaft.

Still another object is to provide a compression hub apparatus including deformable lock means which deforms upon application of an axially directed force in such a manner that it causes the body to be locked to the shaft.

SUMMARY OF THE PRESENT INVENTION

Briefly, the present invention is comprised of a compression hub apparatus for mounting a cylindrical body to a rotatable shaft and includes a hub means having means forming an end wall with a central aperture for receiving the shaft and cylindrical side walls which define a cylindrical central recess therewithin, means for securing the hub means to the body, deformable lock means disposed within the recess and about the shaft, and cover means for mating with the hub means and for applying an axially directed force upon the lock means causing it to deform and lockingly engage the shaft and the hub side wall, thereby locking the body to the shaft. In one embodiment, the deformable lock means comprises a plurality of dish-shaped disks.

In a second embodiment, the deformable lock means is comprised of a continuous length of material having a transverse cross section resembling a skewed parallelogram, the length of material being helically wound about an axis such that the surface corresponding to one short side of the parallelogram forms a shaft engaging inner periphery, and the surface corresponding to the opposite short side of the parallelogram forms a side wall engaging outer periphery.

One advantage of the present invention is that it provides a secure lock between the outer body and the shaft.

Another advantage of the present invention is that the compression hub apparatus self-centers the body with respect to the shaft.

Still another advantage is that the compression hub apparatus can be used to lock many different size bodies to a shaft.

Other objects and advantages will be apparent to those skilled in the art after having read the following detailed disclosure which makes reference to the several figures of the drawings.

IN THE DRAWING

FIG. 1 is an axial section view showing one embodiment of a hub apparatus in accordance with the present invention;

FIG. 2 is a plan view of the deformable dish-shaped disk shown in FIG. 1;

FIG. 3 is a cross-sectional view of the disk taken through the lines 3—3 of FIG. 2;

FIG. 4 is an axial section view showing a second embodiment of the present invention similar to that of FIG. 1 but wherein the key and keyway extend the entire length of the hub assembly;

FIG. 5 is an axial section view showing another embodiment of the present invention in which the deformable lock means comprises a helically wound continuous length of material;

FIG. 6 is a perspective view of the deformable lock means shown in FIG. 5;

FIG. 7 is a partial axial section of another embodiment of a deformable lock means; and FIG. 8 is an axial section view showing a body mounted on a shaft and illustrating two embodiments of the hub compression apparatus of the present invention.

DETAILED DESCRIPTION OF THE PREFERRED EMBODIMENT

Referring now to the drawings, and in particular to FIG. 1, the compression hub apparatus of the present invention is illustrated in axial section. As shown therein a cylindrical body 20 is coaxially mounted to a shaft 10 by a compression hub apparatus, generally designated by the numeral 30. The shaft 10 is cylindrical in shape and rotatable about an axis 12. A key slot 14 is cut into the shaft. The body 20 has an elongated annular shape and is illustrated as being a conveyor pulley with a plurality of outer bearing members 22. A rigid annular disk 24 is affixed to the inner surface of the body 20 near its open end as with welds 26. The inner annular surface 28 of the disks 24 is precisely machined so as to accurately describe a circular cross section. Although not shown, another rigid annular disk is positioned near the other open end of the body in order to firmly secure and center the shaft therebetween. A portion of the outer surface of the disk is recessed so as to form a face 29. Four studs 25 protrude outwardly from the face 29 for receiving a hub 32 of the compression hub apparatus 30. The face 29 is machined flat to form a snug fit with the mating surface of the hub.

The compression hub apparatus, generally designated by the numeral 30 comprises the hub 32, a cover 34, deformable lock means, generally designated by the numeral 40, and a key 38.

The hub 32 is cylindrically shaped and includes an end wall 42 and an annular side wall 44 which define a cylindrical central recess in the hub. An aperture 46 and a keyway 47 extend through the end wall. The aperture 46 has a diameter slightly greater than the diameter of the shaft 10 and communicates with the central recess such that the shaft 10 can be received therethrough. The open end of the hub 32 opposite the end wall 42 is flanged as at 48 and includes four equally-spaced apertures 43 therethrough for receiving the respective studs 25. The surfaces 49 and 51 of the hub 32 are machined so as to provide a smooth fit with the surface 28 and with the cover 34 respectively. Thus, the hub 32 is received snugly within the inner annular region of the disk 24. An O-ring 54 insures the snug fit and provides a seal for the interior of the body 20.

The cover 34 is an annularly-shaped disk which includes equally spaced apertures 56. The apertures 56 are aligned with the apertures 43 in the hub for receiving the studs 25 so as to enable the cover to mate with the hub. An O-ring 58 is disposed within a slot 60 around the inner periphery of the cover 34 so as to seal the hub apparatus.

Referring now to FIGS. 2 and 3, the deformable lock means in accordance with the preferred embodiment of the present invention is illustrated. The lock means comprises a plurality of dish-shaped disks 62. Each of the disks has an outer annulus 64 which has a diameter in the undeformed state which is slightly less than the inner diameter of the central recess. The inner annulus 66 includes a keyway 68 for receiving the key 38 and a plurality of relief slots 70 for relieving the stresses set up in the disk 62 upon deformation. In the undeformed state, the diameter of the inner annulus 66 is slightly greater than the diameter of the shaft 10.

The outer periphery of the deformable disk 62 includes a plurality of notches 69 spaced therearound to relieve the disk from stresses set up in the disk as it expands outwardly upon deformation. The lock means is shown as having 16 disks although the number of disks is dependent upon the length of the side wall and the thickness of the disks. Preferably, the disks are formed from a 14 gauge spring steel material with the sides of the disk inclined at an angle of 10° from the base.

In assembling the compression hub apparatus 30 on the shaft 10, the key 38 is placed in the key slot 14 of the shaft and the hub means is slid along the shaft with the key slot in alignment with the key 38 and the apertures 43 aligned with the studs 25 so that the flange 48 of the hub abuts the machined face 29 of the disk 24. The deformable disks 40 are then slid over the shaft into the central recess such that the base portion of the end disks extend slightly beyond the outermost surface 51 of the flange 48. The cover 34 is then positioned on the shaft with its apertures 56 in alignment with the studs 25 and forced axially along the shaft toward the hub. As the cover is forced into a mating relationship with the hub, it produces an axially directed force to be applied upon the disks 62 which compresses the disks longitudinally inwardly against the end wall 42 of the hub 32 and thereafter causes the disks to deform in such a manner that the inner annulus 66 of each disk lockingly engages the shaft and the outer annulus 64 lockingly engages the side wall 44 thereby locking the body to the shaft. A nut 66 is torqued over each of the studs 25 to secure the cover to the hub means. Since the disks are enclosed within the central recess, no twist is transmitted to the shaft as the nuts are secured against the cover. It should be noted that the machined surfaces 28, 44 and 49 assure that the shaft 10 is self-centered within the body 20.

In a second embodiment of the present invention, as illustrated in FIG. 4, the key slot 72 in the shaft 10 is lengthened to hold a correspondingly longer key 74. In this embodiment, the key extends through the associated keyways in the dish-shaped disks 62, the flange 48 of hub 32, and the cover 34. Because of the clearance between the key and the surfaces bordering the keyway, this embodiment does not provide a seal on the shaft from the external environment.

There is illustrated in FIG. 5 and 6 of the drawings another embodiment of the compression hub means made in accordance with the present invention. Many of the parts of the compression hub apparatus are identical in construction to like parts in the apparatus described above, and accordingly there has been applied to each component of the apparatus illustrated in FIGS. 5 and 6 a reference numeral that corresponds to the reference numeral applied to the like part of the apparatus described above.

The fundamental difference between the compression hub apparatus of FIGS. 5 and 6, and the apparatus described above is that the deformable lock means is comprised of a coiled continuous length of material 80 having a transverse cross section that generally resembles a skewed, elongated parallelogram. The material comprises a plurality of turns 81 and is helically wound about axis 12 such that the surface 82 corresponding to one short side of the parallelogram forms the shaft engaging inner periphery and the surface 84 corresponding to the opposite short side of the parallelogram forms the hub side wall engaging outer periphery.

In this embodiment the helical winding is formed while the material is in the annealed state and preferably comprises 12 coils. After annealing the material is heat treated to relieve stresses. The length of the long sides of the parallelogram, designated by the numeral 86, between the outer surface of the shaft and the inner surface of the side wall is in the range between 0.312 and 0.375 inches. Each turn has a cross section, designated by the numeral 88, which is between 0.100 and 0.125 inches. Both of the surfaces 82 and 84 corresponding to the short sides of the parallelogram are serrated as at 90 to improve locking engagement with the shaft and the hub surfaces.

Similar to the respective embodiments illustrated in FIGS. 1 and 4, the end wall 42 of the hub 32 includes a keyway 47 for receiving the key 38. If a sealing configuration is desired, then an O-ring 58 is included around the inner annulus of the cover 34 and an O-ring 54 is included at the annular boundary between the disk and the hub 32. The keyway 68 is preferably formed in the material 80 by grinding after the material has been shaped into a helical winding.

In mounting the body to the shaft with this embodiment of the compression hub apparatus, the hub and the winding are positioned on the shaft with the winding extending slightly beyond the open end of the central recess. As the cover is inserted over the recess, the outermost coils are forced axially inwardly and caused to wedge into the adjacent coil. Simultaneously, with the axial movement, the coil deforms radially inwardly and outwardly whereby the outer serrated surfaces bite into the corresponding surfaces of the hub and the shaft, thereby locking the body to the shaft.

Referring to FIG. 7 an alternative embodiment is illustrated for the helically wound deformable lock means. As illustrated, the lock means includes a ridged protrusion 94 intermediate the outermost and innermost serrated edges. In this alternative embodiment, each coil is substantially at an 80° angle with respect to the axis 12, and each protrusion extends about 0.02 inches outward of the coil surface. The protrusion provides a pivot point about which the adjacent coil pivots after the axial compression of the length of material so as to enable the inner and outer serrated surfaces to expand into the shaft and the body respectively and serves to more uniformly space the coils from one another as they are wedged into the central cavity.

It should be noted that the directional positioning of the deformable lock means on the shaft is not critical to this invention. Referring to FIG. 8, the outer portions of a body are illustrated as being mounted on a shaft with two embodiments of the apparatus of the present invention. It should be recognized that the two embodiments are shown for purposes of illustration only since the same embodiment is preferably used at both ends of the shaft to mount the body thereto. In the left-hand portion of this figure, the locking disks are illustrated as being positioned with the base portions being disposed away from the inner surface of the cover, whereas in FIGS. 1 and 4, the base portion is shown disposed closest to the shaft such that the edges of the disk extend toward the middle of the shaft. Also in FIGS. 5 and 8 the winding of the deformable lock means are positioned so as to face in opposite directions with respect to the cover.

In accordance with this invention, several embodiments of a compression hub apparatus have been described. From the above, it will be seen that the compression hub apparatus fulfills all of the objects and advantages set forth above.

While there has been described what is at present considered to be the preferred embodiments of this invention, it will be understood that various modifications may be made therein, and it is intended to cover in the appended claims all such modifications that fall within the true spirit and scope of the invention.

What is claimed is:

1. In a conveyor pulley structure including a cylindrical pulley having axially apertured end walls, a round shaft extending through the pulley along its axis, and hub means for affixing each end of the pulley to the shaft, an improved hub means comprising:

an elongated cylindrical hub body having an annular flange at one end for abutting the pulley end walls, a first axial bore of a first diameter slightly larger than the diameter of the shaft and extending axially from the opposite end of said hub body toward said one end of said hub body, and a second axial bore of a second diameter larger than said first diameter and extending axially from said one end toward said opposite end and intersecting said first bore at a point along the axial length of said hub body such that when said hub body is disposed on said axle, said second bore and said axle form an annular recess of a predetermined axial length; deformable locking means disposed within said recess and including a continuous length of material having a transverse cross section generally resembling a skewed, elongated parallelogram with a pair of opposite, relatively short sides and a pair of opposite, relatively long sides, said length of material being helically wound about the shaft to form a coil wherein the coil surface corresponding to one of said short sides forms an inner periphery of the locking means for engaging the shaft, and wherein the coil surface corresponding to the other of said short sides forms an outer periphery of said locking means for engaging the cylindrical inner surface of said second bore;

cover means for mating with said hub body and for applying an axially directed force upon said coil causing the windings of said coil to deform in such a manner that said inner periphery frictionally engages said shaft and said outer periphery frictionally engages said cylindrical inner surface thereby locking said hub body to said shaft; and means for securing said flange and said cover means to the end wall.

2. In a conveyor pulley structure as recited in claim 1 wherein one of said long sides includes a ridge extending along the length of said length of material which protrudes outwardly therefrom to abut adjacent coil windings and provide a pivot ridge which allows a wedging action to occur in the respective coil windings as said axially directed force is applied to said coil.

3. In a conveyor pulley structure as recited in claim 1 wherein the surfaces forming said short sides are serrated to increase the frictional engagement of said locking means to said shaft and said cylindrical inner surface.

* * * * *